US010316814B2

(12) United States Patent
Oh

(10) Patent No.: US 10,316,814 B2
(45) Date of Patent: Jun. 11, 2019

(54) ENGINE START CONTROL METHOD

(71) Applicants: Hyundai Motor Company, Seoul (KR); Kia Motors Corporation, Seoul (KR)

(72) Inventor: Young-Kyu Oh, Gwachecon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 71 days.

(21) Appl. No.: 15/671,372

(22) Filed: Aug. 8, 2017

(65) Prior Publication Data
US 2018/0135588 A1 May 17, 2018

(30) Foreign Application Priority Data

Nov. 14, 2016 (KR) ........................ 10-2016-0151109

(51) Int. Cl.
*F02D 41/06* (2006.01)
*F02D 41/04* (2006.01)
*F02D 41/30* (2006.01)
*F02N 19/04* (2010.01)
*F02D 41/00* (2006.01)
*F02D 41/40* (2006.01)

(52) U.S. Cl.
CPC ........... *F02N 19/04* (2013.01); *F02D 41/009* (2013.01); *F02D 41/0025* (2013.01); *F02D 41/064* (2013.01); *F02D 41/403* (2013.01); *F02D 2200/021* (2013.01); *F02N 2200/021* (2013.01); *F02N 2200/023* (2013.01); *F02N 2300/20* (2013.01); *Y02T 10/44* (2013.01)

(58) Field of Classification Search
CPC ............... F02N 19/04; F02N 2200/023; F02D 2200/021
USPC ..................................................... 123/179.21
See application file for complete search history.

(56) References Cited

U.S. PATENT DOCUMENTS 5,357,927 A * 10/1994 Saito ................... F02D 19/0605
123/406.54
7,681,558 B2 * 3/2010 Gale ................... F02D 41/0025
123/490

(Continued)

FOREIGN PATENT DOCUMENTS

JP H06-26427 A 2/1994
JP 2009-002314 A 1/2009
(Continued)

*Primary Examiner* — Hieu T Vo
*Assistant Examiner* — Arnold Castro
(74) *Attorney, Agent, or Firm* — Morgan, Lewis & Bockius LLP

(57) ABSTRACT

Disclosed is an engine starting control method for a flexible fuel vehicle (FFV) of supplying the heated fuel to the engine by heating an injector heater during cranking when it is determined that cranking condition and fuel heating condition are satisfied at the time of starting the vehicle having a starting auxiliary device for cranking the engine of FFV and a device for heating the fuel using the injector heater provided in an injector, wherein a pre-injection is auxiliary performed prior to a main injection during cold starting of the engine when the heating time of the injector heater exceeds a predetermined value, allowing stable starting with low fuel consumption at a time of cold starting an engine using ethanol fuel in winter.

8 Claims, 8 Drawing Sheets

(56) References Cited

U.S. PATENT DOCUMENTS

| | | | |
|---|---|---|---|
| 9,638,117 B2* | 5/2017 | Lent | F02D 41/2422 |
| 2002/0139872 A1* | 10/2002 | Hokao | F02M 51/0682 |
| | | | 239/585.1 |
| 2008/0053415 A1* | 3/2008 | Marriott | F02M 31/125 |
| | | | 123/549 |
| 2008/0208438 A1* | 8/2008 | Sukegawa | F02D 41/047 |
| | | | 701/105 |
| 2009/0234561 A1 | 9/2009 | Marriott et al. | |
| 2010/0078507 A1* | 4/2010 | Short | F02M 53/06 |
| | | | 239/584 |
| 2010/0294236 A1* | 11/2010 | Surnilla | F02D 41/0025 |
| | | | 123/304 |
| 2011/0184629 A1* | 7/2011 | Krengel | F02D 19/061 |
| | | | 701/103 |
| 2011/0276252 A1* | 11/2011 | Kabasin | F02M 53/06 |
| | | | 701/103 |
| 2013/0275025 A1* | 10/2013 | Isenberg | F02M 53/06 |
| | | | 701/103 |
| 2013/0297182 A1* | 11/2013 | Vincenzi | F02D 41/062 |
| | | | 701/103 |

FOREIGN PATENT DOCUMENTS

| | | |
|---|---|---|
| JP | 2011-074779 A | 4/2011 |
| JP | 2014-137019 A | 7/2014 |
| JP | 2014-206116 A | 10/2014 |
| JP | 2014-227940 A | 12/2014 |
| KR | 10-2009-0110141 A | 10/2009 |
| KR | 10-2015-0000003 A | 1/2015 |
| KR | 10-2016-0010671 A | 1/2016 |
| KR | 10-2016-0069886 A | 6/2016 |

* cited by examiner

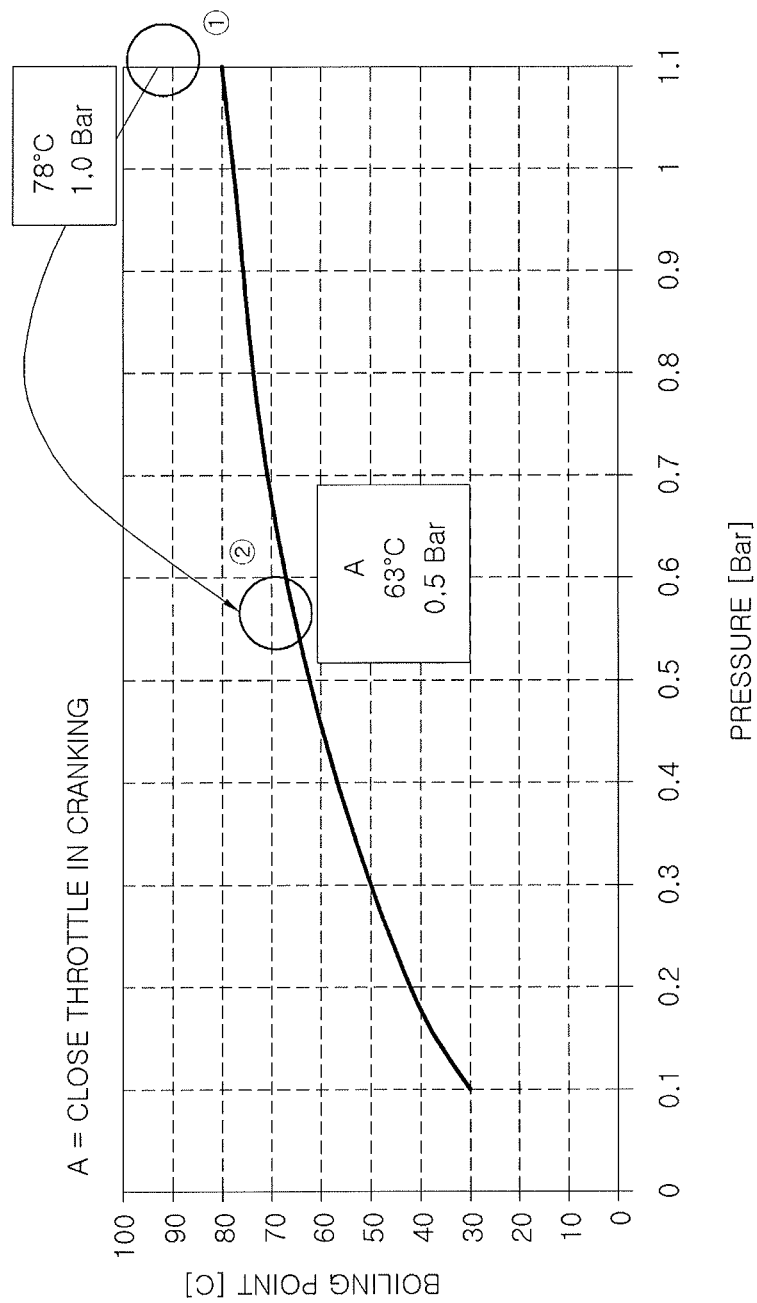

ENGINE START CONTROL METHOD

CROSS-REFERENCE(S) TO RELATED APPLICATIONS

The present application claims priority to Korean Patent Application No. 10-2016-0151109, filed on Nov. 14, 2016, the entire contents of which is incorporated herein for all purposes by this reference.

BACKGROUND OF THE INVENTION

Field of the Invention

The present invention relates to an engine starting control method especially for a flexible fuel vehicle (FFV), and more particularly, the present invention relates to an engine start control method capable of improving startability at cold start of a vehicle using biofuel such as ethanol fuel.

Description of Related Art

In terms of energy source diversification, with correspondence to the Convention on Climate Change as well as agriculture promotion, the vehicle industry has been developing a vehicle that uses bio energy as fuel, and the demand for vehicles using ethanol-fuel, which is relatively cheaper than gasoline, is skyrocketing in Brazil, China and Southeast Asia due to crude oil prices rising.

Accordingly, FFVs capable of utilizing bioethanol, and the like, as fuel are actively spreading to overseas markets, and particularly, the E85 FFVs market has been expanding exponentially from approximately 110,000 vehicles worldwide to 15 million vehicles in 2015.

Particularly, bioethanol among the bioenergy candidates has been increasingly used due to the fuels low production cost and the CO2 reduction effect is as high as 40% compared to gasoline which has a much lower reduction effect. However, ethanol has a low volatility and poor vaporization due its low vapor pressure (40 kPa or less) when compared to gasoline (55-70 kPa). A vehicle using a 100% concentration of ethanol fuel may experience problems with the vehicle's initial startability. The present issue becomes even more serious during a cold start in winter.

As conventional solutions for the initial startability problem of such vehicles, the solutions proposed respectively in patent document 1 and patent document 2 have been considered.

Patent document 1, Korea Patent Registration No. 10-1490907, devises an auxiliary fuel tank system for improving a vehicle's startability during a cold start in winter. The supply fuel for a cold start is stored in the auxiliary tank and supplied to the engine at the time of starting. The supplied fuel for a cold start is gasoline or ethanol with a concentration less than 22% being used. In the present case, the fuel supply on the side of the auxiliary tank has been determined based on a coolant temperature. When the coolant temperature is below a certain level, the cold start fuel stored in the auxiliary tank is supplied to the engine through the cold start line to provide an improved cold startability, and after cold starting, the fuel supply from the auxiliary tank is stopped and fuel is again supplied through the main fuel tank.

On the other hand, patent document 2, Korea Patent Registration No. 10-0980882, devises a method of supplying fuel to the engine by heating the fuel. In the present case, when the ignition (IG) is turned on, the ECU supplies power to the heater disposed in the fuel pump to heat the fuel wherein the temperature of the fuel discharged after starting is increased, solving the low vapor pressure problem of ethanol fuel.

In the same manner as exemplified n patent document 1, the auxiliary fuel tank must be disposed inside the engine compartment. The present layout of the interior of the engine compartment is complicated and manufacturing cost increases due to the disposition of the auxiliary fuel tank. In addition, when a vehicle collision occurs leakage may occur from the auxiliary fuel tank, resulting in a high safety risk. As the storage capacity of the auxiliary fuel tank is small fuel must be replenished frequently to the auxiliary fuel tank at an inconvenience to the user.

In the same manner as patent document 2, it is advantageous in comparison to the method of patent document 1 regarding cost reduction, leaking due to collision, inflow of odor, etc. When heat loss occurs when the heated fuel is supplied to the engine, there is a problem that the improvement effect of the startability is deteriorated. For the present purpose, it is possible to add a protective material, or the like, to the outside of the fuel line. However, it is difficult to effectively reduce the heat loss even in the case of a region with extremely low temperature, and it is difficult to reach the target fuel temperature in a very short time.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine starting control method for a FFV configured for efficiently starting with a smaller supply of fuel in a short time in the case where fuel is heated and supplied by use of an injector having a heating function at the start of the FFV.

The engine starting control method according to an exemplary embodiment of the present invention for solving the above aspects includes supplying the heated fuel to the engine by heating an injector heater during cranking when it is determined that the cranking and fuel heating conditions are satisfied at the time of starting the vehicle; having a device for heating the fuel using the injector heater wherein a pre-injection is auxiliary performed prior to a main injection during the starting of the engine when the heating time of the injector heater exceeds a predetermined value.

A plurality of crank angles of each cylinder may be detected and the pre-injection may be performed with respect to a cylinder close to the TDC (Top dead center) which exceeds a predetermined value based on the detected angle.

The pre-injection may be performed to all cylinders when the detected angle is less than or equal to a predetermined value.

After performing the pre-injection the main injection may be performed after the pre-injection is completed with the fuel heated by the injector heater before the main injection.

The fuel supply may be stopped for a certain time period after the pre-injection, and a dry cranking may be performed to implement cranking in a state of closing the throttle when the heating time of the injector heater exceeds a certain predetermined value.

After implementing the dry cranking a throttle opening degree may be detected and the throttle may be opened to perform the pre-injection when the detected throttle opening degree exceeds a predetermined value.

After implementing the dry cranking the cranking may be performed in a state of closing the throttle again when the throttle opening degree is equal to or less than the predetermined value.

After performing the pre-injection the main injection may be performed after implementing the pre-injection with the fuel heated by the injector heater before the main injection.

The injector may be heated first using the injector heater for a predetermined time before the cranking when the detected coolant temperature or ambient temperature is less than the predetermined value; after satisfying the IG On condition at cold start of the vehicle; and then before satisfying the cranking condition.

The vehicle is a FFV.

In accordance with the engine control method for a FFV according to an exemplary embodiment of the present invention, stable starting may be achieved even during a cold start of the engine in winter using an ethanol fuel with low vapor pressure.

Further, in accordance with the engine control method for a FFV according to an exemplary embodiment of the present invention, in the case of a cold start of the engine in winter with an ethanol fuel having low vapor pressure, it can be started rapidly with less fuel amount by performing pre-injection together injector heating.

Furthermore, in accordance with the engine control method for a FFV according to an exemplary embodiment of the present invention, by heating the injector using the injector heater and performing pre-injection, an engine can be stably started with a smaller amount of energy and heating time.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a drawing to show the effect of dry cranking of ethanol engine.

Figure 1A:
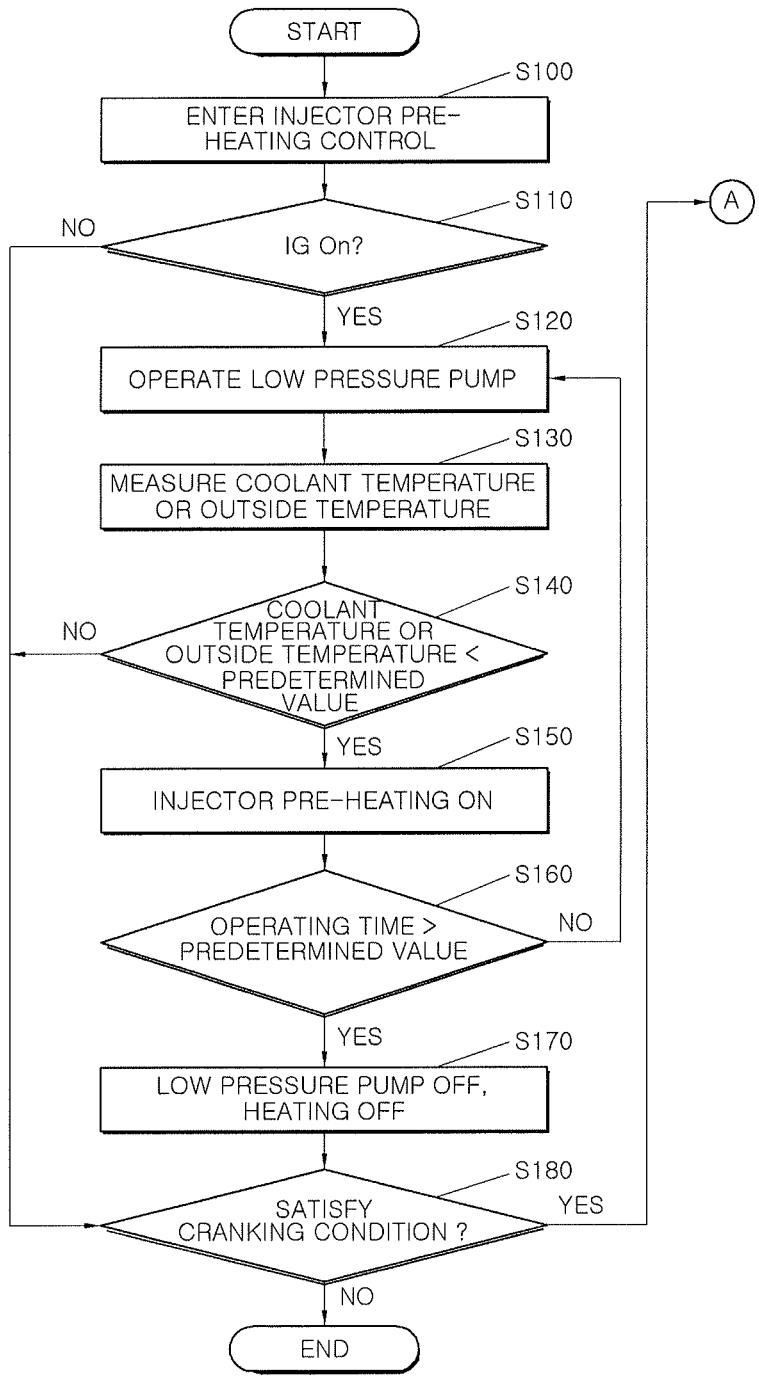
FIG. 1A and FIG. 1B are flowcharts depicting a starting control method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The starting control method according to an exemplary embodiment of the present invention is a method of controlling the starting of an engine of a FFV using biofuel including ethanol fuel. The engine of a FFV may be equipped with a fuel pump to supply fuel to a fuel rail inside a fuel tank storing ethanol fuel, and a low-pressure pump for supplementing the fuel pressure at the time of starting may be provided. The ethanol fuel supplied to the engine, by the operation of the fuel pump in the fuel tank, is pressurized to a predetermined pressure by the high pressure pump operated by a camshaft and supplied to the fuel rail.

On the other hand, an Electronic Throttle Control (ETC) is configured to control the throttle valve opening and may be disposed in an intake pipe of the engine of a FFV; and a throttle valve detection sensor may be provided configured to detect the opening degree of the throttle valve.

An intake manifold may be disposed in each cylinder of the engine to introduce air drawn through the throttle valve, an injector for injecting fuel into each cylinder may be disposed in the vicinity of an intake port of the intake manifold, and each cylinder head of the engine is equipped with a spark plug to ignite the injected fuel.

Fuel supplied to the injector may be supplied to the nozzle part of the injector. After staying in the nozzle part of the injector, when the solenoid is operated by a power source supplied to the injector, the needle may open and the fuel around the needle may be injected downward. At the present time, to heat the ethanol fuel to be supplied to the engine, a heater for supplying heat at same time as the supplied current may be disposed on a circumferential surface of the needle in the nozzle part, and the fuel is heated by the heat transferred from the heater, so that the atomization of the fuel can be promoted even during a cold start.

A cylinder block of the engine may be equipped with a coolant temperature sensor that detects the coolant temperature to cool the engine, and a crankshaft position sensor may be configured to detect the angle of the crankshaft when the crankshaft of the engine rotates. Furthermore, the crankshaft may be disposed with a starter driven by a motor as an auxiliary starting device for cranking the crankshaft when starting the engine.

The signals transmitted from the various sensors may be inputted to the ECU, and the ECU outputs control signals for controlling various equipment related to the fuel supply, ignition equipment, and the like.

Hereinafter, a starting control method according to an exemplary embodiment of the present invention will be described with reference to the attached drawings.

Figure 1B:
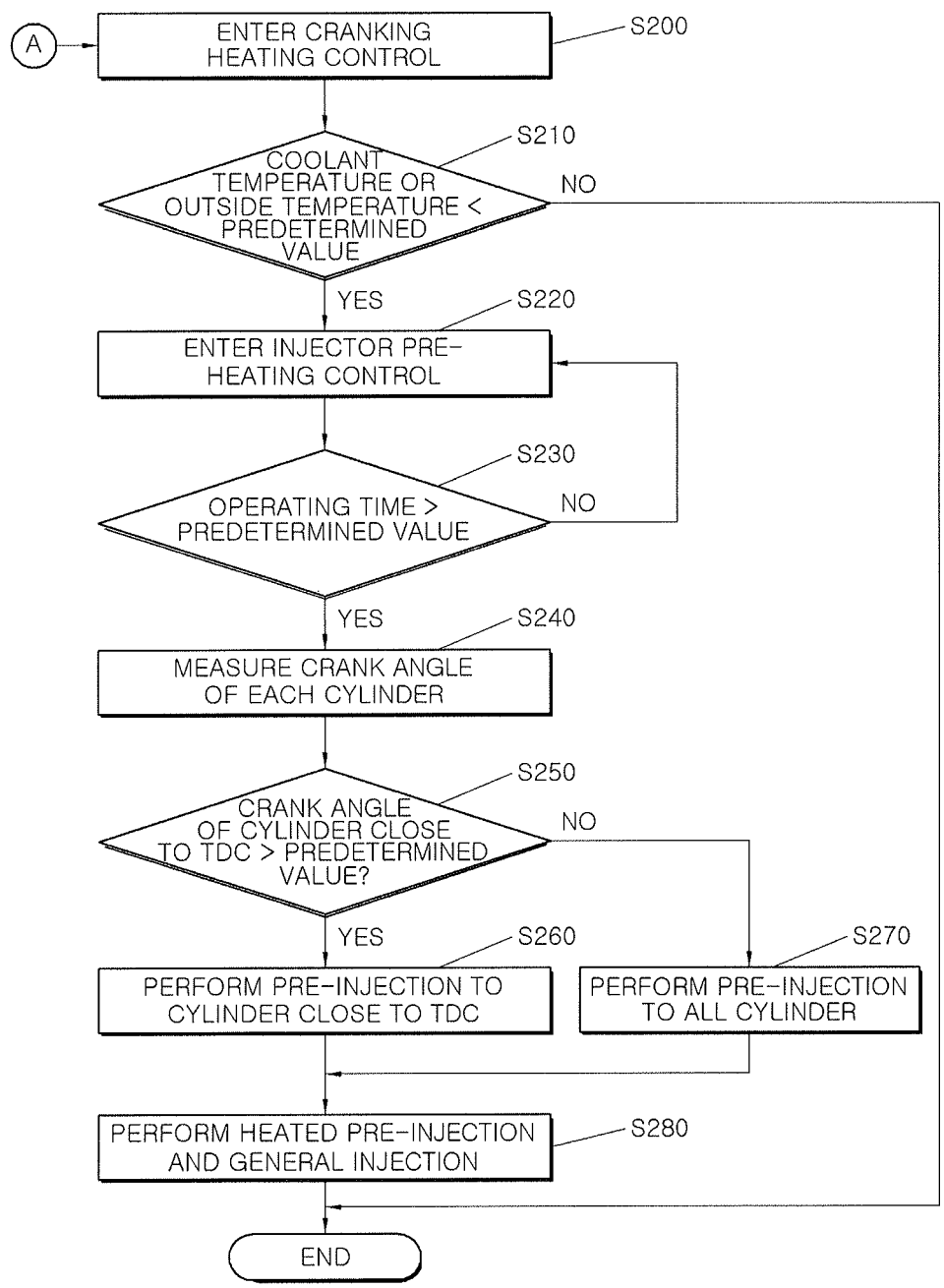

FIG. 1 is a flowchart depicting a starting control method according to an exemplary embodiment of the present invention.

According to FIG. 1, prior to the injector heating control by engine cranking, a heating control may be performed to preheat the injector to ensure sufficient heating of the fuel using the injector heater at step S100. To accomplish the present, the ECU may first determine whether it is in a starting key on state (IG Key On) by the driver at step S110. In the IG On state, the following starting control may be performed.

At the present time, the low-pressure pump disposed in the fuel tank to supply fuel to the engine operates for a fixed time, or in the case that the fuel pressure is below the predetermined value required for starting, the low-pressure pump will operate for a predetermined time based on the current fuel pressure value only as much as the required interval for starting at step S120.

The ECU detects the coolant temperature through the coolant temperature sensor or detects the ambient temperature outside the vehicle through the ambient temperature sensor at step S130. The ECU then determines whether the coolant temperature or ambient temperature is less than a predetermined value at step S140.

In the case that the detected coolant temperature or the outside temperature is less than the predetermined value; when the fuel is not heated using the injector heater the low vapor pressure of the ethanol fuel makes starting the engine difficult. Therefore, the injector heater is operated to heat the injector in advance before the cranking is performed at step S150.

The ECU determines whether or not the time spent operating the injector heater exceeds a predetermined value at step S160. When the ECU determines that the operating time exceeds the predetermined value, the operation of the low-pressure pump and the injector heater is stopped at step S170. The operation of the injector heater and the operation of the low-pressure pump are interlocked, wherein when the injector heater stops operating the low-pressure pump also stops operating.

The ECU determines conditions including the coolant temperature and atmospheric pressure, and determines whether or not the condition for performing the cranking by the auxiliary starting device including the starter, is satisfied at step S180. When it is determined that the condition for performing the cranking is not satisfied the starting control is stopped.

When it is determined that the cranking condition is satisfied, the ECU enters the heating control step at the time of cranking in the starting control method according to an exemplary embodiment of the present invention at step S200.

When entering the heating control stage at the time of cranking, the ECU detects the coolant temperature or the ambient temperature through the coolant temperature sensor or the ambient temperature sensor again, and determines whether it is necessary to heat and supply the fuel by driving the injector heater at the time of cranking at step S210.

When the coolant temperature or outside temperature is above the predetermined value, it is determined that there is no problem in starting even when the fuel of the current state is supplied as is, and the starting is performed by performing the cranking as it is without executing the injector heating and pre-injection control described later.

On the other hand, when the coolant temperature or the ambient temperature is less than the predetermined value, the injector is heated by use of the injector heater so the fuel may be heated and supplied when considering the low ethanol vapor pressure at step S220.

When the ECU determines that the elapsed time operating the injector heater exceeds the predetermined value at step S230, the ECU executes a control for improving the startability by performing a pre-injection into the cylinder of the engine before the main injection is performed as described later.

Prior to performing the pre-injection control, the ECU detects the crank angle for each cylinder according to the signal from the crankshaft position sensor at step S240. The external circumference of the crankshaft is equipped with a crankshaft position sensor which outputs a constant pulse signal every time the crankshaft rotates at a certain angle. Through the output value of the crankshaft position sensor, it is possible to determine whether the piston for each cylinder is at the TDC or the bottom dead center (BDC).

The ECU detects a crank angle for each cylinder through a signal from the crankshaft position sensor, and compares the crank angle of the cylinder close to the TDC with a predetermined value at step S250. As a result, when the crank angle in the cylinder is close to the TDC and is equal to or less than the predetermined value, that is, when the piston is not close to the TDC more than a certain degree, all cylinders are pre-injected prior to main injection of ethanol fuel at step S270.

When the pre-injection is performed as an early injection before the main injection, a fuel (vapor) puddle is generated in the cylinder, and then is vaporized and naturally distributed in the cylinder liner at the time of cranking after that. Therefore, even when an ethanol fuel with a low vapor pressure is used, it is possible to shorten the cranking start time and shorten the fuel amount supplied as well as the heating time. When the general injection is performed without performing the pre-injection, it is impossible to achieve the above-mentioned effect.

On the other hand, as a result of detecting a plurality of crank angles of each cylinder by the signal from the crankshaft position sensor, when the piston exceeds the predetermined crank angle of the cylinder close to the TDC, that is, the ECU determines that the piston position of the cylinder close to the TDC is close to the TDC by more than a certain degree it performs the pre-injection only for the cylinder close to the TDC at step S260. The present is because the remaining cylinders are ignited after the second round.

Then, after performing the pre-injection by which the fuel is sufficiently heated by the injector heater, the main injection is performed to start the engine at step S280.

Table 1 below shows the results when comparing the consumed fuel amount, cranking start time, time of starting and energy required for injector heating in a case of performing, or not performing, the pre-injection according to an exemplary embodiment of the present invention.

TABLE 1

| Cold start condition | No pre-injection | Perform pre-injection |
|---|---|---|
| Pre-injection fuel amount(g) | 0.00 | 2.36 |
| Preheating time (sec) | 7.68 | 4.10 |
| Wall wetting fuel amount (g) | 2.20 | 0.02 |
| manifold pressure (kPa) | 56.8 | 55.9 |
| Subsequent supply fuel amount (g) | 0.81 | 0.61 |
| Total heated fuel amount(g) | 3.01 | 0.63 |

TABLE 1-continued

| Cold start condition | No pre-injection | Perform pre-injection |
|---|---|---|
| Cranking start time (sec) | 2.42 | 2.24 |
| Total time of starting (sec) | 10.10 | 6.34 |
| Entire heater energy consumed for starting (kJ) | 5.43 | 3.67 |

Table 1 shows that when the injector heater is preheated before the main injection, the wall wetting phenomenon, in which the fuel remains as a liquid without being vaporized and flows through the cylinder wall, is greatly reduced (from 2.20 g to 0.02 g). In addition, since the pre-injection is first performed using sufficient time and energy to be vaporized during cranking, and is vaporized in the cranking process and naturally distributed in the cylinder, the long heating time and the excessive energy supplied, considering the low vapor pressure of the ethanol fuel, are unnecessary. Therein, it is possible to reduce the cranking start time (approximately 8% reduction) and the total start time (37% reduction) and significantly save the supply of heated fuel for start-up (89% reduction).

Table 2 shows the change in the amount of contaminant material produced in the exhaust gas of ethanol fuel when the injector heater is operated and when it is not operated.

TABLE 2

| Amount of noxious gas in exhaust gas (average, g/km) | | | | |
|---|---|---|---|---|
| THC | CO | NMHC | NMHC-ETOH | injector heating on or off |
| 0.15 | 0.45 | 0.116 | 0.015 | heater OFF |
| 0.05 | 0.31 | 0.002 | 0.007 | heater On |
| 67 | 32 | 81 | 53 | Reduction amount (%) |

As seen in the Table 2, when the injector heater is operated the amount of harmful gas in the exhaust can be reduced from at least 32% up to 81%. Through the present finding, it can be seen that by operating the injector heater it is possible to perform stable combustion even in the case of ethanol with low vapor pressure.

Figure 2A:
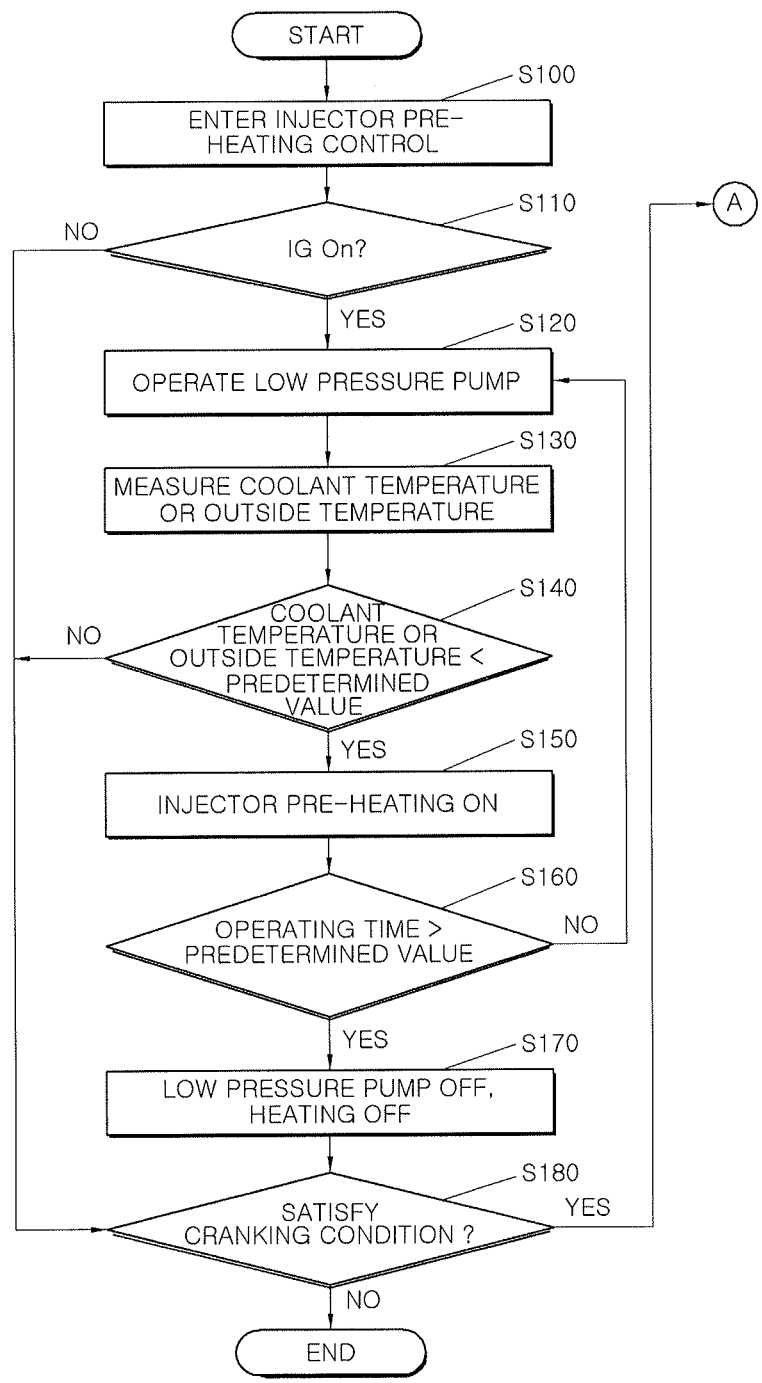
FIG. 2A and FIG. 2B are flowcharts depicting a starting control method according to another exemplary embodiment of the present invention.
Figure 2B:
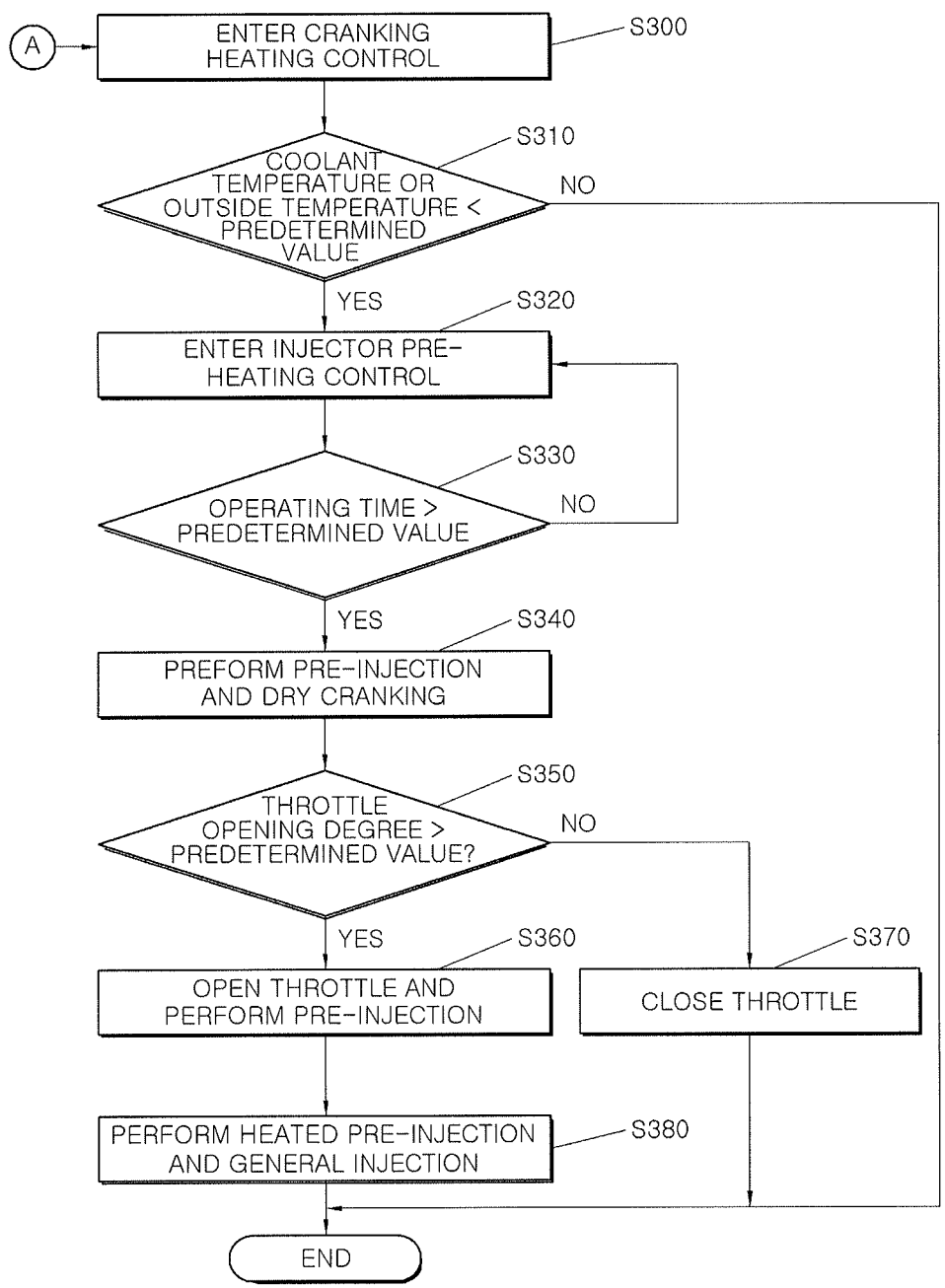

FIG. 2 is a flowchart depicting a starting control method according to another exemplary embodiment of the present invention. As the injector preheating steps described above with reference to FIG. 1 is the same as the embodiment of FIG. 2, the repeated description will be omitted.

When the ECU determines that the cranking condition is satisfied at step 180 of FIG. 2, the ECU enters the cranking heating control step at step S300.

When entering the heating control step at the time of cranking, the ECU detects the engine coolant temperature or the ambient temperature through the coolant temperature sensor or the ambient temperature sensor, and determines whether to heat and supply the fuel, or not, by driving the injector heater at the time of cranking at step 310.

When the coolant temperature or outside temperature is above the predetermined value, it is determined that there is no problem in starting even when the fuel of the current state is supplied as it is, so that the injector heating and the pre-injection and dry cranking control, which will be described later, are not performed and the cranking is performed to start.

On the other hand, when the coolant temperature or outside air temperature is less than the predetermined value the injector is heated by the injector heater wherein the fuel can be heated and supplied while considering the low ethanol vapor pressure at step S320.

When it is determined that the time for driving the injector heater exceeds the predetermined value at step S330, the ECU executes the pre-injection before the main injection into the cylinder of the engine as well as dry cranking at step S340 and as described later.

Figure 4:
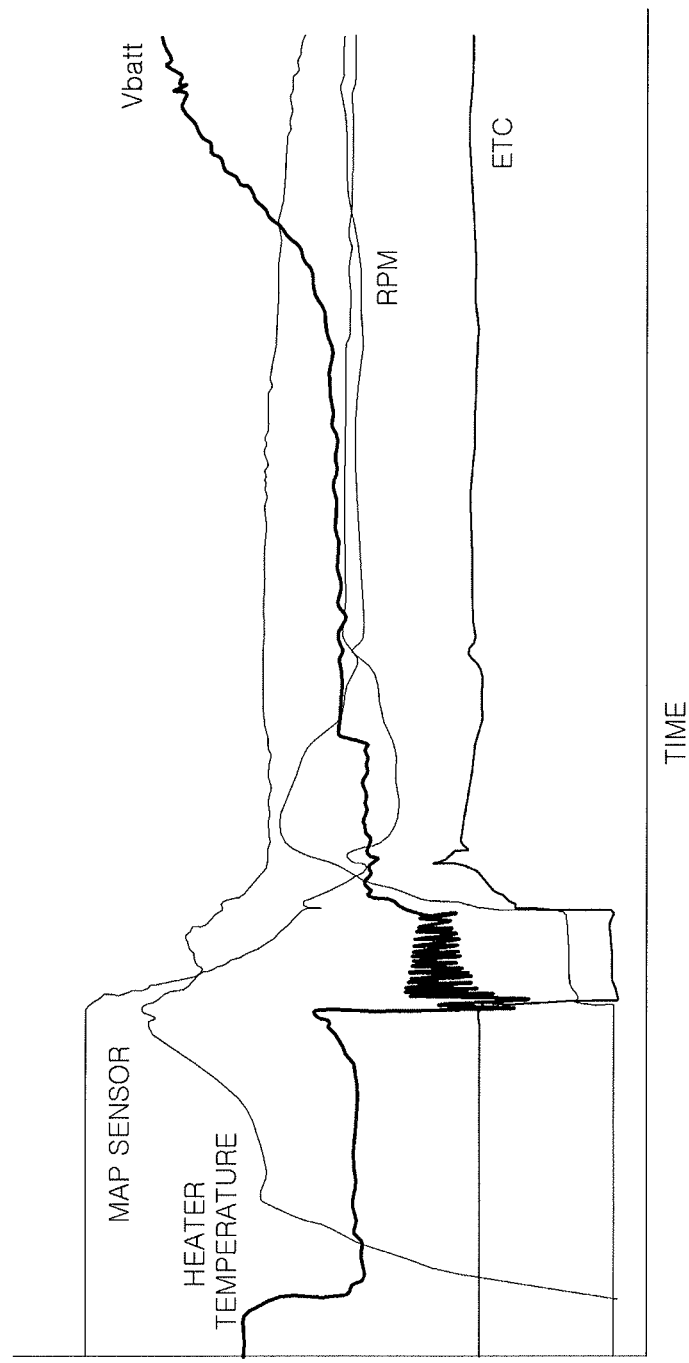
FIG. 4 is a signal diagram indicating the operating state of the dry cranking in the starting control method according to another exemplary embodiment of the present invention.

FIG. 4 is a signal diagram indicating the operating state of the dry cranking in the starting control method according to an exemplary embodiment of the present invention. As shown in FIG. 4, in the case of pre-injection and subsequent dry cranking, the throttle opening is closed by the ETC while the heating by the injector heater is continued after performing the pre-injection, wherein the supply of the outside air is stopped. In the state that the fuel supply and ignition are delayed, the ECU performs the cranking by the starting auxiliary means. Further, as shown in FIG. 4, the ETC closes the throttle for a specified time period and opens it again.

According to the present dry cranking condition, the inside of the cylinder can form the state of an intake vacuum by cranking, the necessary vacuum steam and fuel amount can be easily increased and the inside can be vacuumed, wherein combustion can occur easily with little steam. Therefore, as shown in FIG. 3, the cylinder internal pressure is moved from the ① state to the ② state through dry cranking, even in the case of the fuel having a low vapor pressure including 100% concentration ethanol fuel, so that enough vaporization can be achieved to solve the winter startability problem.

Therefore, prior to the dry cranking the pre-injection is performed using the injector heated to a certain temperature by the injector heater, wherein the pre-injected fuel can easily vaporize during the dry cranking process and spread into the cylinder combustion chamber during the dry cranking process, completing the starting in a short time, reducing the required heater energy at the time of a cold starting in winter, and greatly reducing the total consumed fuel amount as described above.

On the other hand, the ECU receives a signal regarding the ETC predetermined opening degree after the pre-injection and the driving ranking, and determines whether the opening value exceeds a predetermined value or not at step S350.

When it is determined that the ETC opening exceeds the predetermined value, the ETC is opened and the pre-injection is performed at step S360, and the main injection is performed after the pre-injection of the fuel heated by the injector heater at step S380.

On the other hand, when it is determined that the ETC opening is equal to or less than the predetermined value, the ECU controls the ETC to close the throttle again for stable starting at step S370, and does not perform the pre-injection.

Figure 5:
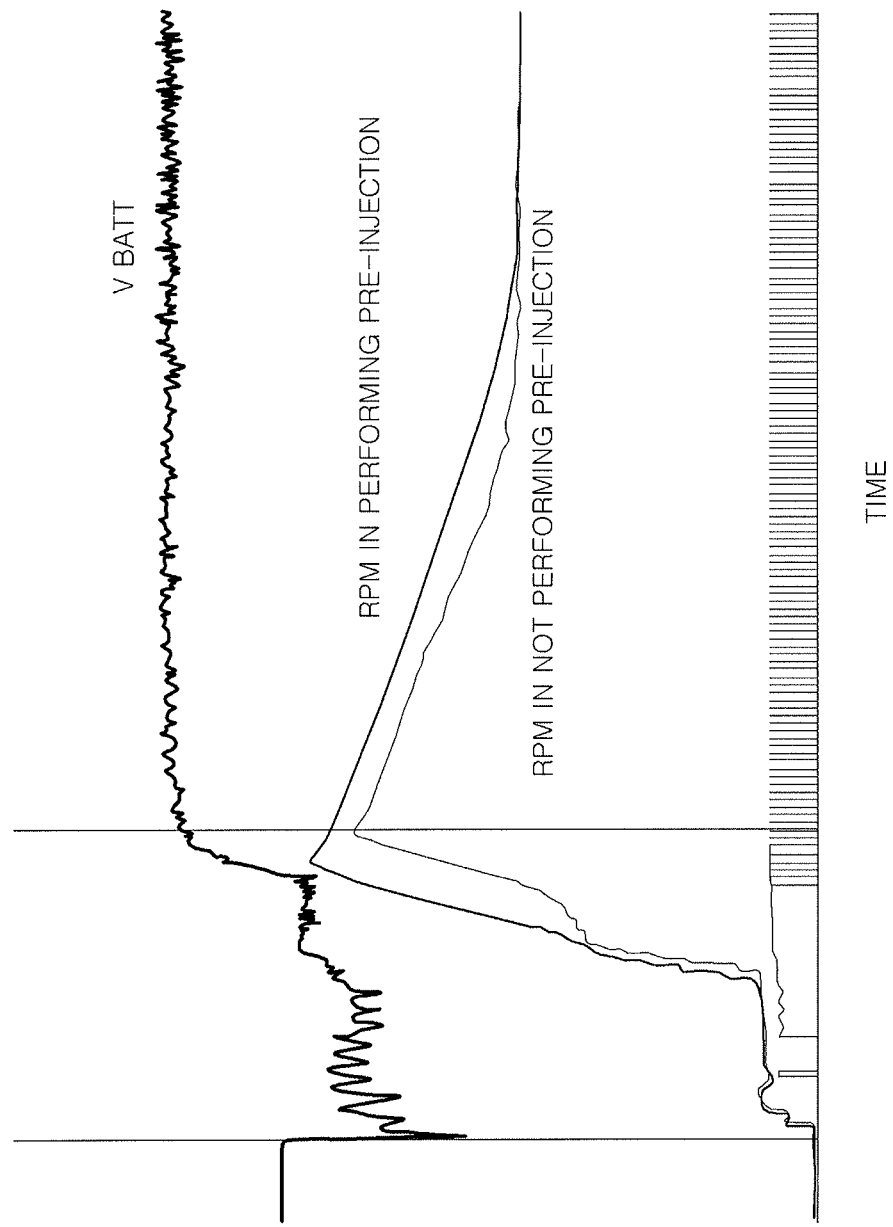
FIG. 5 is a drawing depicting the changes over time of the engine RPM when the starting control method according an exemplary embodiment of the present invention is performed.
Figure 6:
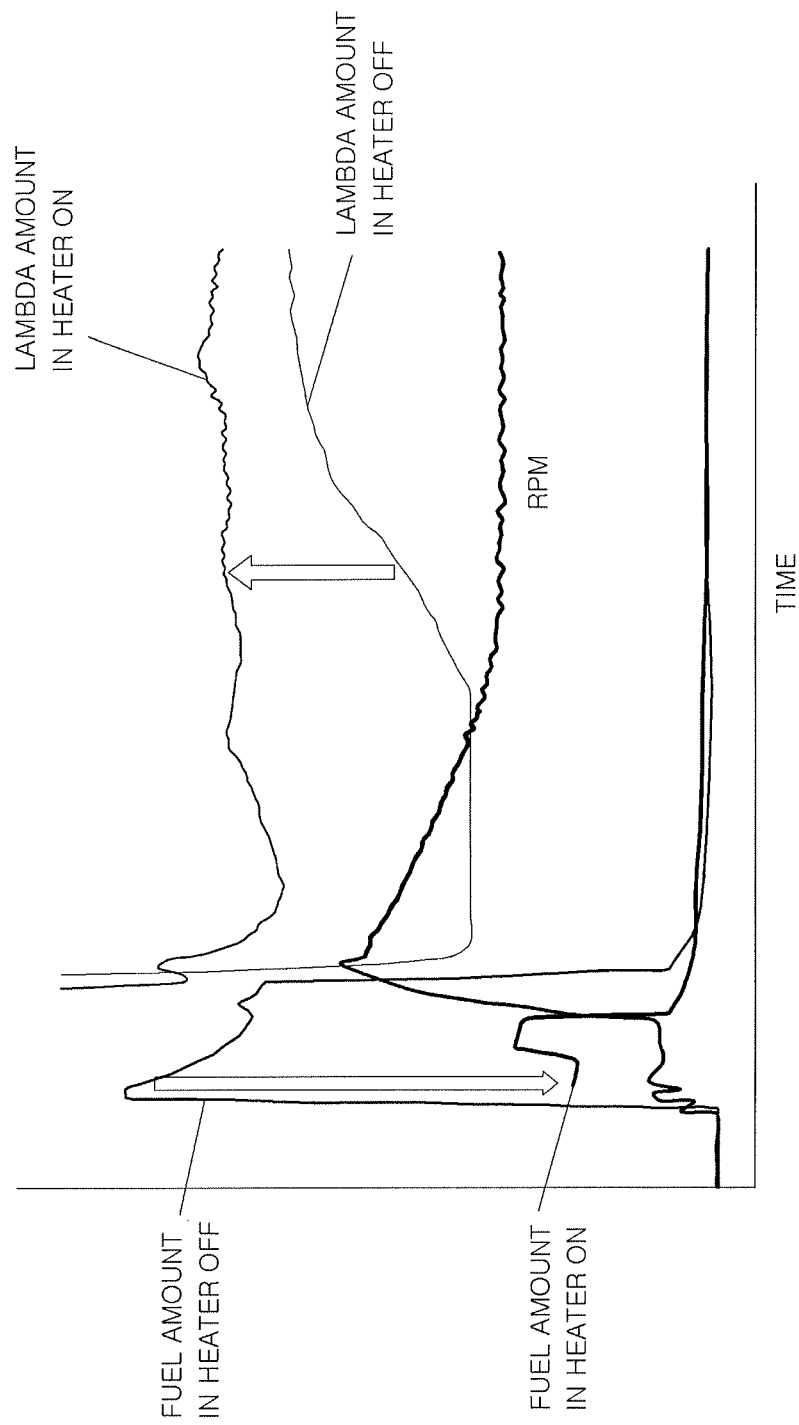
FIG. 6 is a drawing depicting the fuel amount consumption and a lambda amount when starting control method according to an exemplary embodiment the present invention is performed.

FIG. 5 to FIG. 6 show the effect of the engine starting control method of a FFV according to an exemplary embodiment of the present invention when contrast with a comparative example.

FIG. 5 compares the engine's RPM with and without injector heating mode. In the present regard, V BATT represents the voltage of the battery. As shown in FIG. 5, it can be seen that the output RPM of the engine increases more rapidly in a short time period in the case of performing the pre-injection together with the injector heating compared to the case of not performing the pre-injection. It can be seen from the present case that starting can be achieved rapidly and steadily by implementing the engine starting control method of a FFV according to an exemplary embodiment of the present invention.

FIG. 6 is the result of comparing the fuel amount required for starting and the lambda value of the exhaust gas using the lambda sensor in the exemplary embodiment of the present invention when the injector heater is operated compared to when the injector heater is not operated. As shown in FIG. 6, when the injector heater is turned on, it can be seen that the required fuel amount at the time of starting is significantly reduced. Furthermore, when the injector heater is turned on, it can be seen that the lambda value of the exhaust gas is significantly higher than that of when the injector heater is turned off.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine starting control method for a vehicle of supplying a heated fuel to an engine by heating an injector heater during cranking when it is determined that cranking condition and fuel heating condition are satisfied at a time of starting the vehicle having a device for heating the fuel using the injector heater;

wherein a pre-injection is auxiliary performed prior to a main injection during starting of the engine when a heating time of the injector heater exceeds a first predetermined value, wherein a plurality of crank angles of each cylinder are measured and the pre-injection is performed with respect to a cylinder close to top dead center (TDC) exceeding a second predetermined value based on the measured angle, and wherein the pre-injection is performed to all cylinders when the measured angle is less than or equal to the second predetermined value.

2. The method of claim 1, wherein, after performing the pre-injection, the main injection is performed after the pre-injection is performed with the fuel heated by the injector heater before the main injection.

3. The method of claim 1, wherein the fuel supply is configured to be stopped for a predetermined period after the pre-injection, and a dry cranking to implement cranking in a state of closing a throttle is performed when the heating time of the injector heater exceeds a third predetermined value.

4. The method of claim 3, wherein, after implementing the dry cranking, a throttle opening degree is measured and the throttle is configured to be opened to perform the pre-injection when the measured throttle opening degree exceeds a fourth predetermined value.

5. The method of claim 3, wherein, after implementing the dry cranking, the cranking is performed in a state of closing the throttle again when the throttle opening degree is equal to or less than a fifth predetermined value.

6. The method of claim 4, wherein, after performing the pre-injection, the main injection is performed after implementing the pre-injection with the fuel heated by the injector heater before the main injection.

7. The method of claim 1, wherein the injector is heated first using the injector heater for a predetermined time before the cranking when measured coolant temperature or ambient temperature is less than a sixth predetermined value after satisfying IG On condition at cold start of the vehicle and then before satisfying the cranking condition.

8. The method of claim 1, wherein the vehicle is a flexible fuel vehicle (FFV).

\* \* \* \* \*